— USOO5964256A

United States Patent [19]
Bedi et al.

[11] Patent Number: 5,964,256

[45] Date of Patent: Oct. 12, 1999

[54] APPARATUS AND METHOD FOR CHANGING OIL IN AN INTERNAL COMBUSTION ENGINE AND SIMULTANEOUSLY DETERMINING ENGINE OIL CONSUMPTION AND WEAR

[75] Inventors: Ram D. Bedi; Adrianus J. van der Griendt, both of Birmingham, Mich.

[73] Assignee: K.J. Manufacturing, Wixom, Mich.

[21] Appl. No.: 08/109,612

[22] Filed: Aug. 19, 1993

Related U.S. Application Data

[60] Division of application No. 07/705,297, Jun. 13, 1991, Pat. No. 5,263,445, which is a continuation-in-part of application No. 07/516,243, Apr. 27, 1990, Pat. No. 5,062,398.

[51] Int. Cl.⁶ .................................. B65B 1/04; B65B 3/04
[52] U.S. Cl. .............................. 141/83; 141/65; 141/66; 184/1.5; 123/196 R; 123/196 S
[58] Field of Search .......................... 123/196 R, 196 A, 123/196 S; 184/1.5, 105.1; 141/21, 65, 66, 67, 83, 94, 95, 192, 198, 98; 222/134, 135; 73/863.81, 863.86; 128/205.18

[56] References Cited

U.S. PATENT DOCUMENTS

| | | | |
|---|---|---|---|
| 1,884,820 | 10/1932 | Osborne | 184/1.5 |
| 1,886,098 | 11/1932 | Hedglon | 184/1.5 |
| 1,955,169 | 4/1934 | Bertschinger | 184/1.5 |
| 2,158,914 | 5/1939 | Rinehart | 184/1.5 |
| 2,249,303 | 7/1941 | Smith | 184/1.5 |
| 2,320,043 | 5/1943 | Parson | 184/1.5 |
| 2,366,073 | 12/1944 | Vallerr | 184/1.5 |
| 2,425,848 | 8/1947 | Vawter | 210/62 |
| 2,454,585 | 11/1948 | Alderman | 184/1.5 |
| 2,552,749 | 5/1951 | Tabet | 184/1.5 |
| 2,554,389 | 5/1951 | Stevens | 134/167 |
| 2,594,779 | 4/1952 | Huffman | 184/1.5 |
| 2,683,499 | 7/1954 | De Croes | 285/333 |
| 3,033,311 | 5/1962 | Edgar et al. | 184/1.5 |
| 3,272,535 | 9/1966 | Neely | 285/114 |
| 3,489,245 | 1/1970 | Broadwell | 184/1.5 |

(List continued on next page.)

FOREIGN PATENT DOCUMENTS

| | | |
|---|---|---|
| 0974011 | 9/1975 | Canada . |
| 2452592 | 11/1980 | France . |
| 2633976 | 1/1990 | France . |
| 2035759 | 1/1972 | Germany . |
| 2231100 | 1/1974 | Germany . |
| 2744776 | 4/1979 | Germany . |

OTHER PUBLICATIONS

The National Oil and Lube News—Nov. 1989, pp. 1B and 5B NY Fast Lube is Industry Innovator.

Valvoline's Progressive Oil Sample Testing Program; The Key to Solving Problems Before They Happen. Publication date Unknown but at least as early as May 8, 1989.

Auto–Matic Oil Changer Advertisement Carol Wright Gifts © 1990.

National Oil and Lube News—Nov. 1989 pp. 1B and 4B European Evacuation Method Enters U.S.A.

Fluid Evacuators Promotional Literature Publication Date Unknown.

National Petroleum News—Sep. 1989 p. 13 Why Quick Lube Outlets Are Grabbing Market Share.

*Primary Examiner*—Steven O. Douglas
*Attorney, Agent, or Firm*—Young & Basile

[57] ABSTRACT

A method and apparatus for changing oil and measuring oil consumption in an internal combustion engine having an internal oil lubrication distribution passage system with an oil filter and oil reservoir which includes the steps of connecting an external, separable apparatus to the internal oil lubrication distribution system at a first point upstream of the oil filter and at a second point in fluid communication with the oil reservoir; removing spent oil from the oil reservoir and measuring the amount removed; introducing a measured amount of fresh oil appropriate for the internal combustion engine into the oil reservoir; and calculating the difference between the amount of fresh oil introduced to and the spent oil removed from the oil reservoir.

33 Claims, 3 Drawing Sheets

U.S. PATENT DOCUMENTS

| | | | |
|---|---|---|---|
| 3,720,287 | 3/1973 | Martel | 184/1.5 |
| 3,858,449 | 1/1975 | Singer | 73/422 R |
| 4,095,673 | 6/1978 | Takeuchi | 184/1.5 |
| 4,151,823 | 5/1979 | Grosse et al. | 123/196 A |
| 4,193,487 | 3/1980 | Takeuchi | 184/1.5 |
| 4,331,185 | 5/1982 | Rinaldo et al. | 141/95 |
| 4,491,103 | 1/1985 | Deadman | 123/196 S |
| 4,508,195 | 4/1985 | Millet | 184/1.5 |
| 4,674,456 | 6/1987 | Merritt | 123/196 S |
| 4,676,206 | 6/1987 | DeGrazia, Jr. | 123/196 S |
| 4,739,861 | 4/1988 | Desjardins | 184/1.5 |
| 4,776,431 | 10/1988 | Poling | 184/1.5 |
| 4,807,674 | 2/1989 | Sweet | 141/59 |
| 4,854,277 | 8/1989 | Kenney | 123/196 A |
| 4,869,346 | 9/1989 | Nelson | 184/1.5 |
| 4,884,660 | 12/1989 | Bedi | 184/1.5 |
| 4,901,693 | 2/1990 | De Grazia, Jr. | 123/196 S |
| 4,909,205 | 3/1990 | Bewley, III | 123/196 S |
| 4,938,315 | 7/1990 | Ohta et al. | 184/1.5 |
| 4,951,784 | 8/1990 | Bedi | 184/1.5 |
| 4,964,373 | 10/1990 | Bedi | 123/196 R |
| 5,273,085 | 12/1993 | Edwards et al. | 141/83 |

APPARATUS AND METHOD FOR CHANGING OIL IN AN INTERNAL COMBUSTION ENGINE AND SIMULTANEOUSLY DETERMINING ENGINE OIL CONSUMPTION AND WEAR

CROSS-REFERENCE TO RELATED APPLICATIONS

This application is a divisional application of Ser. No. 07/705,297 now U.S. Pat. No. 5,263,445, filed Jun. 13, 1991 currently pending in the United States Patent Office which itself is a continuation-in-part of Ser. No. 07/516,243 filed Apr. 27, 1990 which has issued as U.S. Pat. No. 5,062,398 on Nov. 5, 1991.

BACKGROUND OF THE INVENTION

1. Field of the Invention

The invention relates to a apparatus and method for changing motor oil in an internal combustion engine having an oil pan or similar oil reservoir. Such reservoirs can be found in automobiles, trucks, tractors, heavy earth moving equipment, military equipment, or the like. More particularly, this invention relates to methods in which spent or dirty oil is expediently removed from the oil pan and analyzed as to amount and condition, the lubrication passages thereafter flushed with flushing fluid to remove contaminants, and then the lubrication system crankcase and oil pan are refilled with a measured amount of fresh oil appropriate for the engine.

2. Background of the Relevant Art

The benefits of routine oil changes in an internal combustion engine are well known. Routine oil changes have been shown to increase engine life and performance. With repeated prolonged use, motor oil builds up suspended particles, metallic and non-metallic, from the abrasive and adhesive wear of engine parts against one another and from products of incomplete combustion and improper air intake. The particles in turn cause abrasive wear of the engine bearings, piston rings and other moving parts and the reduction of the motor oil lubricity as various additives and lubricating components become depleted. This adversely affects engine performance and if left unchanged can destroy or cripple the engine performance. It is recommended by at least one oil manufacturer that the level of total solid concentration be limited to levels below 3.0% with levels of silica being present in amounts lower than 25 parts per million and sodium in amounts lower than 200 parts per million.

To obtain satisfactory engine performance, and maintain solids concentration levels in the motor oil lower than the recommended 3.0%, changing the motor oil in an internal combustion engine is a necessary, but an undesirable, dirty and time-consuming task. In currently designed vehicles, the oil pan serves the purpose of a reservoir for circulation of engine oil. Engine lubrication is generally accomplished through a gear-type pump. The pump picks up engine oil from the oil pan sump, where oil is drawn up through the pick-up screen and tube, and passed through the pump to the oil filter. The oil filter is generally a full flow paper element unit. In some vehicles, an oil filter bypass is used to insure adequate oil supply, should the filter become plugged or develop excessive pressure drop. Oil is routed from the filter to the main oil gallery. The oil gallery supplies valve train components with oil, and by means of intersecting passages, supplies oil to the cam shaft bearings. Oil draining back from the rocker arms is directed, by cast dams in the crank case casting, to supply the cam shaft lobes. Oil also drains past specific hydraulic lifter flats to oil cam shaft lobes directly. The passages supplying oil to the cam shaft bearings also supply the crank shaft main bearings through intersecting passages. Oil from the crank shaft main bearings is supplied to the connecting rod bearings by means of intersecting passages in the crank shaft. The front cam bearing can include a slot on its outside diameter to supply oil to the cam sprocket thrust face. In some engines, many internal engine parts have no direct oil feed and are supplied either by gravity or splash from other direct feed components. A bypass valve can also be disposed in the oil pick-up screen to insure adequate oil flow if the screen should become restricted. A pressure regulator valve, sometimes located in the oil pump body, maintains adequate pressure for the lubrication system and bypasses any excess back to the suction side of the pump. Oil from the pump passes through the filter before going to the engine oil galleries. In the filter, the oil passes through a filtering element where dirt and foreign particles are removed.

To remove the contaminated oil, the drain plug, generally located in the lowermost region of the oil pan, is opened. The spent oil containing suspended particles is permitted to flow under gravity out of the pan into a suitable receptacle. After the spent oil is removed, the plug is replaced and fresh oil is added to the engine usually through a separate opening in the engine valve cover. The process of gravity drainage does not remove all of the spent oil with its metallic and non-metallic particulates which stick to the oil pan container walls, as well as engine components such as the crank shaft, connecting rods, pistons and the like which are exposed to the motor oil spray lubrication. These particles remain to be mixed with fresh motor oil. Thus the concentration of contaminants is lowered by dilution and only a part of the total contaminates are actually eliminated.

The oil change process is essentially the same whether performed at home, at service stations or at one of the various oil change centers which have opened in recent years. The flow rate, or time required for oil drainage, is the same for each of these locations, because it is limited by the size of the drain plug aperture and the force of gravity. Service stations and other locations simplify the process of oil drainage with the use of hydraulic racks, special oil collection receptacles and the like. However, this specialized and expensive equipment is not readily available to the typical automotive owner who may wish to change the oil in his vehicle. It has been estimated that the retail market of oil is approximately 2.83 billion quarts or approximately 700 million gallons. The do-it-yourself individual has been found to be price sensitive, and tends to distrust the quality of service stations and other oil change centers. The do-it-yourself individual typically believes that if you want a job done right, you do it yourself. However, the current design of vehicles does not lend itself to do-it-yourself oil changes in a convenient clean and effortless manner. Many vehicles have low ground clearance making it difficult to access the oil drain plug for removal of the spent oil, and also making it difficult to collect the oil without contaminating the surrounding environment.

Regardless of the manner in which oil change is accomplished, it has long been appreciated that engine oil consumption can be indicative of engine performance and general engine condition. Excessive oil consumption can be indicative of engine problems such as malfunctioning piston rings, leaking and sagging exterior gaskets and seals or a lack of integrity in seals between the oil passages and coolant system. Information about specific increases in oil consumption would be of value to the vehicle owner to assist him in scheduling appropriate engine maintenance and repair before minor engine problems become major mechanical failures which compromise engine performance and engine life and introduce engine oil contaminants to be environment either as products of combustion or as leakage which can indiscriminately contaminate surfaces of the exterior engine compartment, as well as road and garage surfaces.

Environmental protection is a prominent social issue in our present society. Therefore, it would be desirable to encourage that all oil changes be performed in the most environmentally safe manner possible. It is estimated that there are approximately 119 million privately owned passenger vehicles. These vehicles require approximately 360 million oil changes a year, using an average of 1.2 gallons per change based on an average oil change frequency of 2.94 times a year. This amounts to approximately 550 million gallons of motor oil changed per year. Of this amount, it is estimated that 70% of motor oil is installed by motorists themselves. It is believed that pursuant to present practice, the spent oil drained by motorists finds its way into spent household containers, such as milk cartons. The household containers are closed and disposed of in the garbage which can and will finally find its way into the local waste dump. As the household container deteriorates, the oil and its contaminates will eventually seep into the surrounding ground and any ground water below the dump site. It has been estimated that 300 million gallons of oil a year seep into U.S. soil creating serious potential ground water pollution problems. It would be desirable environmentally and economically if this oil could be collected and recycled. In order to motivate the do-it-yourself market, it is desirable in the present invention to make the collection of oil during oil changes effortless, clean and inexpensive.

In establishing a system for encouraging oil recycling and resource recovery, it is also highly desirable to provide an oil change system which is self-documenting. By this, it is meant that the system is capable of accurately measuring and recording the amount of spent oil removed from various engines and the amount of fresh oil introduced into these engines. Accurate records of the amount of spent oil collected can be valuable in producing any waste manifests required under existing environmental protection and/or resource recovery laws.

Such records would provide regulatory agencies with an accurate indication of an oil handler's compliance with existing laws. The records would also be valuable to the operator of any oil change service by providing him with documentation demonstrating his adherence to all applicable laws and an opportunity to assist his customers in evaluating the need for overall engine maintenance.

Conservation of energy and the trade deficit are also major issues in today's society. It is estimated that 250–360 million gallons of spent oil can now be easily collected and profitably recycled. The price of spent oil so collected is four dollars per barrel at best, while the price of crude oil is much greater at approximately $18.00 per barrel. Recycling easily collected spent oil could decrease the trade deficit by approximately 120 million dollars, while providing a profitable recycling economy of approximately 86 million dollars per year.

Therefore, it would be desirable to provide a method which accelerates removal of spent oil completely and easily from the crank case. It would also be desirable to provide a system which reduces the amount of spent oil handling as required in the conventional oil change service station. It would also be desirable to provide a system which permits accurate assessment of the amount of oil expended and recovered. Finally, it is desirable to provide a method which could be easily employed by all vehicle owners at a convenient location with all the benefits of the method of the present invention such as time savings, money savings, convenience, minimum exposure to motor oil, environmental protection, energy conservation, trade deficit reduction, and finally longer lasting, better performing engines.

SUMMARY OF THE INVENTION

The present invention includes an apparatus external and separable from the internal combustion engine. The external device would be operably connectible to fresh oil storage means, flushing fluid storage means, waste oil storage means and spent flushing fluid storage means. The external apparatus preferably includes air purge means for purging fluid retained with the oil filter element and any fluid remaining in the lubrication system passages of the internal combustion engine, such that all waste fluid can be deposited within the oil pan reservoir prior to evacuation of the waste fluid by suitable pump means. The pump means of the external apparatus draws waste fluid from the oil pan reservoir into contact with a suitable spent oil measuring device which records and optionally analyzes the amount of spent oil removed from an engine prior to its deposit in the appropriate waste storage or disposal device. In addition, the pump means is connectible to an optional flushing fluid reservoir for pressurized delivery of suitable flushing fluid through the pump means, oil filter element, and lubrication system passages of the internal combustion engine. Furthermore, suitable valve connections are provided for drawing flushing fluid from the oil pan reservoir for recirculation through the pump means, external filtering means, and for pressurized delivery to the oil filter element of the internal combustion engine and thereafter flowing through the lubrication system passages of the internal combustion engine before reaccumulating in the oil pan reservoir for subsequent recirculation as desired. Upon completion of the optional flushing cycle, the valves can be operated to draw the flushing fluid from the oil pan reservoir through the pump means for deposit in the external waste flushing fluid storage means. After evacuation of the optional flushing fluid, the pump means can be connected to the fresh oil storage means for delivery of a metered amount of fresh motor oil into the internal combustion engine, through the oil filter element and lubrication system passages of the internal combustion engine until the appropriate amount of fresh motor oil has been delivered to the internal combustion engine. The amount of fresh motor oil introduced is calculated or predetermined based on vehicle specifications. The difference between the specified volume of fresh oil introduced and spent oil recovered provides an indication of engine performance and wear. This information could be conveyed to the vehicle owner to assist him in determining the cause of engine oil loss and timing of future oil changes. Optionally, this calculation can be included in an integrated system of vehicle maintenance. In such systems the amount of oil loss combined with visual and physical inspection of the vehicle and analysis of the condition of the spent oil would be indicative of various engine malfunctions which, if promptly corrected, would increase engine life and performance and decrease environmental contamination.

The present invention also includes engine and engine compartment mounted adapters. One such adapter is an oil filter mounting adapter typically installed on the engine block, where the oil filter would normally be disposed, to allow relocation of the oil filter assembly to a more convenient location. The oil filter mounting adapter provides passages with external openings adapted to receive hose connections. The hose connections allow oil filter relocation to a convenient position within the engine compartment, if necessary. A second adapter of the present invention is a remote oil filter base with mounting bracket. The remote oil filter base is adapted to receive an oil filter element and includes internal passages with external openings adapted to receive the hose connections from the oil filter mounting adapter. The base preferably includes a mounting bracket adapted to be mounted in any convenient location within the engine compartment. Preferably, this location is chosen, such that the oil filter is readily accessible for ease of replacement during oil changing operations. In addition, in its preferred form, the remote oil filter base includes additional internal passages and external openings adapted to receive hose connections and/or quick connect couplings for connection to the external apparatus portion of the present invention. As a further option, the remote oil filter base can also include an internal passage and external openings to centrally locate all the points of coupling to the external apparatus of the present invention, including a hose connection in fluid communication with a drain plug adapter, which will be described in greater detail below.

A third adapter of the present invention is a drain plug adapter. The drain plug adapter is in fluid communication with the lowermost portion of the oil pan reservoir and includes internal passages and external openings adapted to receive a hose connection. The drain plug adapter is connectible to the drain plug aperture in the lowermost region of the oil pan reservoir and includes two external apertures interconnected with one another. One external aperture can receive the original drain plug of the internal combustion engine or other suitable drain plug, while the other external aperture is adapted to receive a hose connection leading to the remote oil filter base.

In operation, the present invention provides a method for quickly and efficiently removing, measuring and recording the amount of waste oil present in an internal combustion engine, replenishing the lubrication system of an internal combustion engine with an appropriate, measured amount of fresh oil, and optionally, prior to replenishing the engine with fresh oil, flushing the lubrication system, including the internal passages of the engine, with a flushing fluid to remove contaminants thereby providing a cleaner environment for the fresh oil to be introduced in the engine. Additionally, the present invention provides purging of fluid from the oil filter element of the internal combustion engine with pressurized air means. Furthermore, all fluid introduced into the internal combustion engine first flows through the oil filter element of the internal combustion engine and then passes through the lubrication passages within the internal combustion engine prior to accumulating within the oil pan reservoir of the internal combustion engine. This provides expedient and efficient means for purging fluid from the oil filter element, flushing contaminants from the internal passages of the lubrication system during the optional flushing cycle, and prelubricating the lubrication system of internal passages within the internal combustion engine and recharging the oil filter with fresh oil during the fresh oil introduction phase.

Other modifications, characteristics, features and benefits of the present invention will become apparent upon reading the following detailed description of the invention in conjunction with the attached drawings.

BRIEF DESCRIPTION OF THE DRAWINGS

In the following drawings, like reference numerals refer to like parts throughout the various views, wherein.

DETAILED DESCRIPTION OF THE PREFERRED EMBODIMENT

Figure 1:
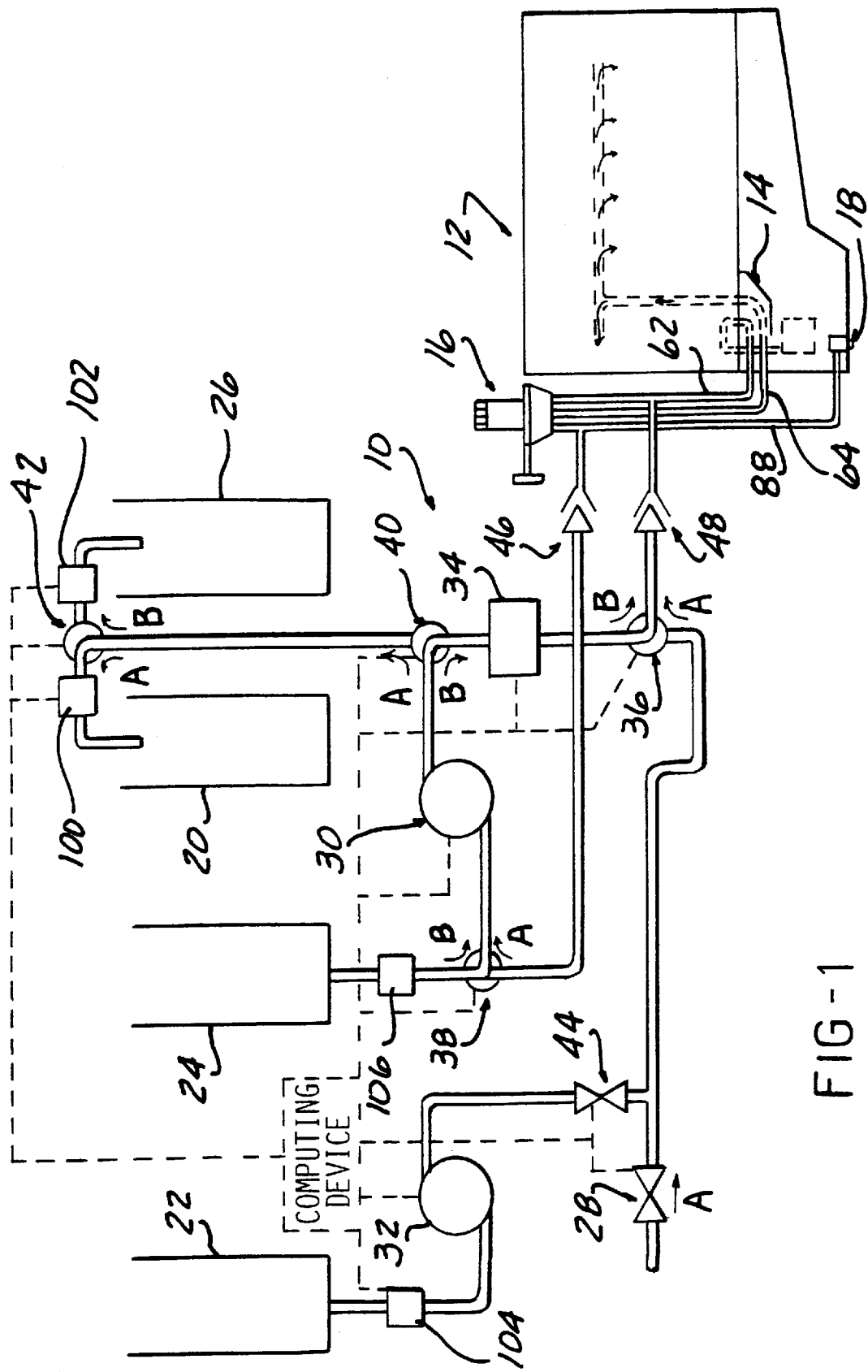
FIG. 1 is a schematic view of an oil change apparatus according to the present invention.

The basic process of the present invention can be employed successfully with internal combustion engines having oil reservoirs and internal oil lubrication distribution passage systems. The term "internal oil lubrication distribution passage system" is defined as, but not limited to, the machined passages and circulation systems present in the engine block, cylinder head, crank shaft, cam shaft and connecting rods. Various engines will have differing lubrication requirements, and therefore, it is to be understood that every engine may not have the passages and circulation systems in all the enumerated components.

The present invention includes an oil changing apparatus, generally designated as 10, which is separable from an internal combustion engine generally designated as 12. The external, separable oil change apparatus can be seen schematically on the left hand side of FIG. 1, while the internal combustion engine 12 is shown schematically on the right hand side of FIG. 1. As will be described in greater detail below, the present invention may include one or more adapters connected to the internal combustion engine 12 to facilitate proper connection of the external oil changing apparatus 10 to the lubrication system of the internal combustion engine 12. The one or more adapters may include an oil filter mounting adapter 14, a remote oil filter and drain mounting bracket 16 and a drain plug adapter 18. One or more of these adapters may be required to modify existing internal combustion engines for use with the oil changing apparatus of the present invention. However, it is envisioned that at some point in time manufacturers may modify the configuration of internal combustion engines to provide the appropriate coupling connections as required for the present invention as original equipment manufacturer's optional or standard equipment. Therefore, in its broadest sense, the present invention does not require the adapters disclosed in this application, but rather only requires a coupling connection capable of effecting removal of spent oil from the engine and associated engine parts, preferably in fluid communication with the lowermost portion of the oil pan reservoir and a second coupling connection in fluid communication with the internal oil lubrication distribution passage system, preferably between the oil pump and the oil filter element. It is also preferable that the coupling connections be provided with quick connect couplings as is conventional and known in the art.

Referring now to FIG. 1, the oil changing apparatus 10 of the present invention is connectible to a plurality of external storage means. The storage means may include a waste oil storage receptacle 20 and a fresh motor oil supply receptacle 22. In an optional configuration, the storage means may also include a flushing fluid supply receptacle 24 and a waste flushing fluid storage receptacle 26. The oil changing apparatus 10 also includes a connection to a source of compressed air (not shown). The connection to the source of compressed air is controlled by appropriate valve means 28, for opening and closing the communication of the compressed air with the oil changing apparatus 10. Of course, it is recognized that the pressure at which the compressed air is supplied through the oil changing apparatus must be controlled so that excessive pressure is not delivered to the internal oil lubrication distribution passage system of the internal combustion engine. It should be recognized that the appropriate control circuitry for regulating the pressure of the compressed air is well known to those skilled in the art of compressed air delivery systems and is commercially available. It should also be noted that the compressed air delivered to the internal oil lubrication distribution passage system should be appropriately dried so that water vapor introduced into the internal oil lubrication distribution passage system which could thereby cause problems with rust and degradation of the oil to be introduced into the internal oil lubrication distribution passage system of the internal combustion engine is minimized.

The oil changing apparatus 10 also includes pump means for evacuating fluids such as spent motor oil from the internal combustion engine 14 and for introducing fluids such as flushing fluid or fresh motor oil into the internal oil lubrication distribution passage system of the internal combustion engine. The pump means may also be used for recirculating fluid within the internal combustion engine for example by drawing fluid from the internal combustion engine fluid reservoir and discharging that fluid through the pump means into the internal oil lubrication distribution passage system.

As depicted schematically in FIG. 1, the pump means may include a first pump 30 for drawing spent oil from the oil reservoir or other suitable location on the internal combustion engine 12 for discharge into the waste oil storage means 20. Associated with the first pump 30 is a suitable means for metering waste oil 100 capable of measuring the amount of spent motor oil removed from the internal combustion engine. The waste oil metering means 100 may be any suitable measuring device which can be integrated into or associated with the first pump 30 at a position upstream of waste oil storage means 20. Preferably the waste oil metering means 100 is any suitable volumetric measuring device which can provide a volumetric measurement of a continuous flow of a fluid such as motor oil.

The waste oil metering means 100 can be positioned at any location in the external pump device 10 suitable for monitoring the volume of spent oil removed from the associated engine 12. In FIG. 1 the waste oil metering means 100 is positioned proximate to the waste oil storage means 20. This position permits the metering means 100 to be dedicated to the measurement of waste oil. Alternately, the waste oil metering means 100 can be located at any position downstream of the associated engine 12 while a position downstream of pump device 30 is highly desirable to insure consistency in fluid pressure and flow rate.

The waste oil metering means 100 can include suitable control switches as well as data recording and transmission devices (not shown) to provide for monitoring, recordation and review of the amount of spent oil removed from a given vehicle. This data can be compiled to generate data on the amount of waste oil produced for storage, reclamation and/or disposal. Control switches are particularly desirable if the waste oil metering means is to be located in a fluid line which carries material other than spent oil to assist in distinguishing the true volume of spent oil passing through the device from the volume of flushing fluid being recirculated and/or removed from the associated engine 12. Such control switches can be employed to turn off the metering device or distinguish sources of fluid flow based on the chronology of the cleaning cycle or physical data such as viscosity picked up by any associated analytical probes or sensors.

Where accurate record of the volume of spent flushing fluid used is required, record of the volume of spent flushing fluid passing through the metering means 100 during the final removal of spent flushing fluid from the engine 14 can be recorded. Alternately, a separate dedicated metering means such as device 102 can be positioned upstream of and proximate to the waste flushing fluid storage means 26 as shown in FIG. 1.

The pump means of the external pump device of the present invention may also include a second pump 32 for introducing fresh motor oil from the fresh motor oil storage receptacle 22 into the internal oil lubrication distribution passage system of the internal combustion engine 12. In such instances, the external pump device 10 may be equipped with a suitable means 106 for metering and measuring the amount of fresh oil administered to the associated engine 14.

When optional flushing is desired the first pump 30 can be interconnected through appropriate valve to supply flushing fluid from a flushing fluid supply receptacle 24 into the internal oil lubrication distribution passage system. Once an appropriate amount of flushing fluid has been introduced into the internal combustion engine 12, the first pump 30 can be configured by the appropriate valve means for recirculating the flushing fluid from the internal combustion engine reservoir through the internal oil lubrication distribution passage system. Measurement of the appropriate amount of flushing fluid can be accomplished by a universal metering means located proximate to the pump 30 or by a dedicated measuring device 106 located downstream and proximate to the flushing fluid storage tank 24.

In addition, through the appropriate setting of the valve means, the first pump 30 can be configured to draw the spent flushing fluid from the reservoir of the internal combustion engine 12 for discharge into the waste flushing fluid storage receptacle 26.

When recirculated flushing fluid operations are desired, it is preferable to include a filter unit 34 on the discharge side of pump 30 to filter fluid being recycled back into the internal oil lubrication distribution passage system of the internal distribution engine 12 to remove suspended particles being carried in the flushing fluid stream prior to reentering the internal combustion engine. The external filter 34 may be sized appropriately for the internal combustion engine being flushed, for example it may be desirable in automotive internal combustion engines to remove particles having a size equal to or greater than 5 microns. However, it should be recognized that the filtration characteristics of the filter 34 can be modified to the extent desired by the operator without adversely effecting the operation of the oil changing apparatus 10 of the present invention. It should also be recognized that through appropriate valve and fluid conduit means arrangements, the present invention can be modified to operate with only one pump, rather than a two pump configuration as schematically shown in FIG. 1. However, the two pump configuration is the preferred configuration of the present invention since it isolates the fresh motor oil from the major portion of the fluid passage conduits used for removal of the waste oil and, optional flushing fluid introduction and recycling portions of the oil change apparatus 10.

The valve means can include a plurality of directional flow control valves. As shown in FIG. 1, the directional flow control valves are designated 36, 38, 40 and 42. Each of these directional flow control valves is operable to divert flow from a first direction indicated by arrow A to a second direction indicated by arrow B.

In operation, the internal combustion engine 12 is brought into proximity with the oil changing apparatus 10. A fluid conduit hose with a first quick connect coupling 46 is connected to the appropriate outlet connection of the internal combustion engine 12 for drawing fluid from the reservoir of the internal combustion engine 12. Another hose with a second quick connect coupling 48 is connected to the appropriate connection of the internal combustion engine 12 for introducing fluid into the internal combustion engine 12 through the filter element and the internal oil lubrication distribution passage system of the internal combustion engine 12 for subsequent accumulation in the oil pan reservoir of the internal combustion engine 12. Directional flow control valve 36 is actuated to provide flow in the arrow A direction and valve means 28 is actuated to introduce pressurized air into the system to purge fluid from the oil filter element thereby causing the residual spent oil retained within the filter element to be discharged through the internal oil lubrication distribution passage system to the oil pan reservoir of the internal combustion engine 12. The check valve 44 prevents pressurized air from entering the second pump 32 and the fresh oil supply receptacle 22.

After completing the purging operation, control valve 28 is de-activated or closed to stop delivery of the compressed air. Directional flow control valve 38 is then operated to provide flow in the arrow A direction. Directional flow control valve 40 is also actuated to provide flow of fluid in the arrow A direction. In addition, directional flow control valve 42 is actuated to provide flow in the arrow A direction. Pump 30 is then energized to draw fluid from the oil pan reservoir of the internal combustion engine 12 for discharge into the spent oil storage receptacle 20. The fluid drawn from the oil pan reservoir is directed through metering means 100 for volumetric measurement and recordation prior to discharge into spent oil storage receptacle 20. The data collected from this measurement step can be formulated by appropriate mathematical operations to provide a variety of potentially useful information to the external pump device operator and/or the automobile owner. Such information can include the amount of spent oil withdrawn from an individual vehicle and the total amount of spent oil discharged into spent oil storage receptacle 20.

In the preferred embodiment, the external pump device 10 can include appropriate computing devices 108 to store, record and display such volumetric information in a readily understandable form. It is within the purview of this invention to render such information in a form suitable for subsequent preparation of appropriate computer-generated manifests suitable for use in compliance with applicable environmental and hazardous waste disposal laws and ordinances.

The waste oil metering means 100 can also be equipped with various probes and sensors to collect and record data on the physical characteristics of the spent oil such as viscosity, lubricity and information regarding the concentration and characterization of contaminants and engine oil additives. This information can be analyzed against a collection of preprogrammed standards to provide a tool for the diagnosis of engine wear and performance. This information can be of great value as a diagnostic tool to the do-it-yourself oil change individual or shop mechanic.

It is anticipated that such diagnostic information could be formulated in a printed form by an appropriate computer program or programs to provide the auto owner and mechanic with a read-out on oil condition and recommendations regarding future engine maintenance based on the condition of the removed spent oil.

In the process of the present invention, after the oil pan reservoir of the internal combustion engine 12 has been emptied, the pump 30 is de-energized. The filter element of the internal combustion engine 12 can be removed and replaced with a clean filter element during or after the emptying cycle as that has no effect on the emptying operation. Fresh oil can then be introduced into the internal oil lubrication distribution passage system by actuating directional flow control valve 36 to allow flow in the arrow A direction if required. Pump 32 is then energized to draw fresh motor oil from receptacle 22 for discharge into the internal combustion engine 12 through the oil filter element and internal oil lubrication distribution passage system for accumulation in the oil pan reservoir of the internal combustion engine 12. The amount of fresh motor oil discharged into the internal combustion engine 12 can be determined by suitable metering means such as a dedicated fresh oil metering means 104 in response to a predetermined internal program governed by information on the make and model of the vehicle engine to be serviced. Alternately, the amount of fresh oil discharged into the associated internal combustion engine can be manually determined by the operator prior to initiation of the oil change cycle.

When the appropriate amount of fresh motor oil has been delivered to the internal combustion engine 12 by the pump 32, the pump 32 is de-energized. The quick disconnect couplings 46 and 48 are then disconnected from the internal combustion engine 12. The internal combustion engine 12 is now ready for normal use with the oil filter element being precharged with fresh oil and engine components prelubricated prior to starting the engine.

The difference between the amount of fresh oil discharged into the internal combustion engine 12 and the amount of spent oil removed can be calculated manually or using appropriate calculating devices associated with the external pump device 10 (not shown). This information can be provided to the vehicle owner as part of a total engine report generated. When combined with any other data collected from the optional physical and chemical analysis of the spent motor oil or even a visual inspection of the engine compartment and vehicle tailpipe, this information provides insight into engine performance and condition.

If optional flushing of the internal oil lubrication distribution passage system is desired, this would preferably occur after removal of the spent oil from the internal combustion engine and prior to replacement of the old filter element with a new filter element. After removal of the spent oil from the internal combustion engine 12, the oil changing apparatus 10 is reconfigured using the valve means to introduce flushing fluid into the internal oil lubrication distribution passage system. Directional flow control valve 36 is operated to provide flow in the direction of arrow B. Directional flow control valve 38 is also operated to provide flow in the direction of arrow B. In addition, directional flow control valve 40 is actuated to provide flow in the direction of arrow B. This provides fluid passage means for pump 30 to draw an appropriate amount of flushing fluid from receptacle 24 for delivery to the internal oil lubrication distribution passage system. The amount of flushing fluid dispensed from receptacle 24 can be varied depending on engine size and configuration. This amount can be measured by metering device 106. Where automation of this procedure is desired, flushing fluid volumes appropriate for various engines can be preprogrammed into an appropriate data processing unit which is linked to the metering device 104 and appropriate actuating valves. If desired, data regarding the volume of flushing fluid dispensed from the receptacle can be recorded to provide information regarding total flushing fluid use and consumption.

In the process of the present invention, once the appropriate amount of flushing fluid has been introduced into the internal combustion engine 12, pump 30 is de-energized temporarily to reconfigure the valves. The flushing fluid disposed within the internal combustion engine 12 can then be recirculated through the internal oil lubrication distribution passage system by operating directional flow control valve 38 to provide for flow in the direction of arrow A. This provides a closed loop recycling system for flushing the internal oil lubrication distribution passage system of the internal combustion engine 12 for as long as is deemed necessary by the oil changing apparatus operator. Preferably, as previously mentioned, an external filter 34 is provided in the recirculating line to remove particles and other contaminants flushed from the internal oil lubrication distribution passage system of the internal combustion engine 12. However, it should be recognized that this is ah additional precaution, since the recirculating flushing fluid is delivered from the pump 30 through the oil filter element of the internal combustion engine 12. Therefore, the filter element of the internal combustion engine 12 would function to remove a portion, if not all, of the contaminants passing therethrough prior to re-entering the internal oil lubrication distribution passage system. For this reason, it is preferable to replace the old filter element of the internal combustion engine 12 after the optional flushing operations have been completed.

When it is determined by the system operator that the flushing operation has continued for a sufficient period of time to clean the internal oil lubrication distribution passage system to the degree desired, the pump 30 is de-energized temporarily while reconfiguring the valve means. In order to evacuate the spent flushing fluid from the oil pan reservoir of the internal combustion engine 12, valve 36 is operated to provide for fluid flow in the direction of arrow A. Valve 40 is also operated to provide for flow in the direction of arrow A. Valve means 28 is then actuated to supply pressurized air for purging fluid from the filter element of the internal combustion engine 12. Fluid is forced out of the filter element by the compressed air and passes through the internal oil lubrication distribution passage system of the internal combustion engine 12 prior to being deposited in the oil pan reservoir of the internal combustion engine 12. After completing the purging operation, valve means 28 is actuated to close off the supply of compressed air to the oil changing apparatus 10. Pump 30 is then energized to draw fluid from the oil pan reservoir of the internal combustion engine 12 for discharge into the spent flushing fluid storage receptacle 26 through directional control valve 42 which has been operated to provide for flow in the direction of arrow B. The total volume of flushing fluid evacuated from the oil pan reservoir of internal combustion engine 12 can be measured by metering means 102. Data regarding the amount of flushing fluid removed from the associated internal combustion engine 12 can be recorded from metering means 102 and compared against the volume of flushing fluid previously introduced to ascertain removal efficiency. Additionally, the total volume of flushing fluid dispensed into the waste flushing fluid receptacle 26 can be recorded and integrated into a manifest suitable for compliance with applicable environmental or waste disposal laws. After evacuation of the flushing fluid from the internal combustion engine 12 is complete, the remaining steps of the oil changing procedure are completed as previously described. If desired, the system is configured to permit draining and purging to be done concurrently.

The flushing fluid employed in the present invention is any material or composition which is miscible with motor oil and exhibits suitable detergency and cleaning characteristics but is inert to the oil pan, gaskets, and associated engine components. It is also preferable that the flushing fluid provide sufficient lubricity or sheeting action to enhance the sheeting action of the flushing fluid dislodging particulate contaminants and carrying them with the flushing fluid as it flows under gravity back to the oil pan. The flushing fluid employed is, preferably, one which is compatible with engine oil and is not detrimental in any subsequent waste oil recycling processes and one which does not deposit undesirable residual constituents which adhere to oil pan surfaces and engine components.

In the preferred embodiment, the flushing fluid employed in the present invention consists essentially of a hydrocarbon miscible with engine oil, a compatible detergent capable of improving the detergency of the flushing fluid and a lubricating additive capable of enhancing the sheeting action of the flushing fluid.

The hydrocarbon employed in the preferred embodiment is an organic fluid selected from the group consisting of high flash point kerosene and mixtures thereof. The flash point of the kerosene is preferably above about 150° F. It is to be understood that other fluids having similar characteristics to high flash point kerosene may be employed in add mixture or substituted in the flushing fluid.

The detergent employed in the present invention is an organic fluid selected from the group consisting of butyl cellosolve, Dowfax surfactants, and mixtures thereof. These and similar surfactants are employed in sufficient concentration to provide detergency in the flushing fluid.

The lubricating additive employed in the flushing fluid is, preferably, a methyl ester having a carbon chain between 12 and 20 carbon atoms or mixtures of such methyl esters in an amount sufficient to provide lubricity and sheeting action to the flushing fluid.

In including the lubricating additive in the flushing fluid of the present invention, it was believed that the lubricating additive would impart characteristics which would increase the sheeting action and cleaning characteristics of the flushing fluid. It has been found, quite unexpectedly that the flushing fluid of the present invention also imparts a residual surface lubricity, which is advantageous in that it provides preliminary lubricant to the engine parts as newly added fresh motor oil is added and circulated through the crank case.

While a certain amount of residual spent oil and contaminants are removed merely by the mechanical scrubbing action of the circulated flushing fluid, additional amounts can be dissolved or removed due to the sheeting action of the flushing fluid as it trickles down the engine components to the oil pan reservoir, and due to the chemical interaction between the residual spent oil and the flushing fluid.

Figure 2:
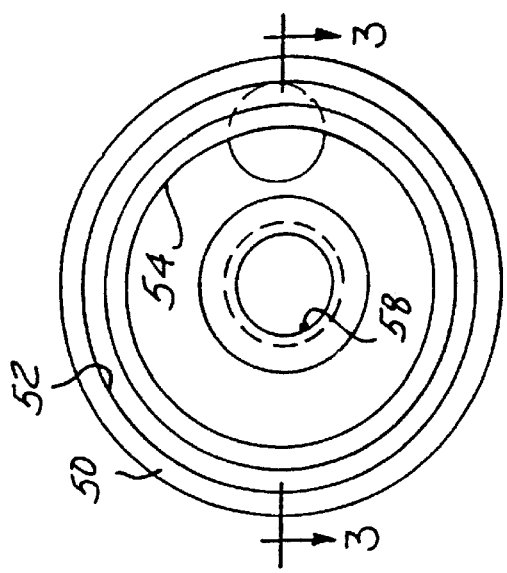
FIG. 2 is a top view of an oil filter mounting adapter according to the present invention.
Figure 3:
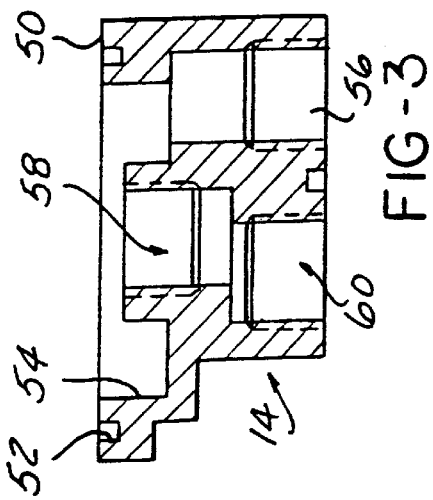
FIG. 3 is a cross-sectional view of the oil filter mounting adapter taken as shown in FIG. 2.
Figure 5:
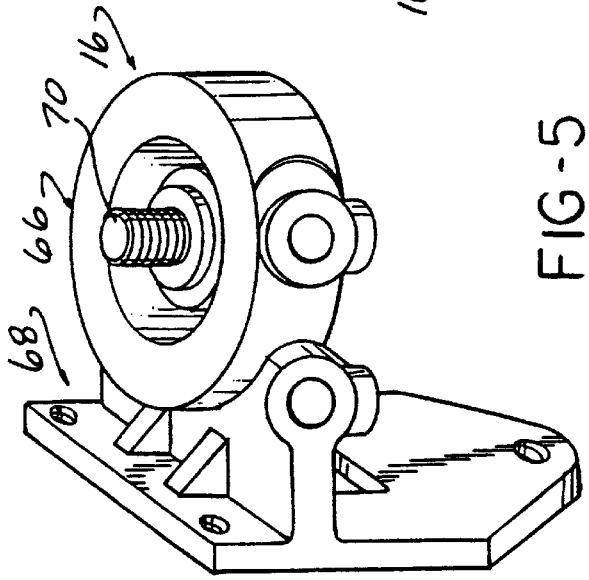
FIG. 5 is a perspective view of a remote oil filter and drain mounting bracket according to the present invention.
Figure 4:
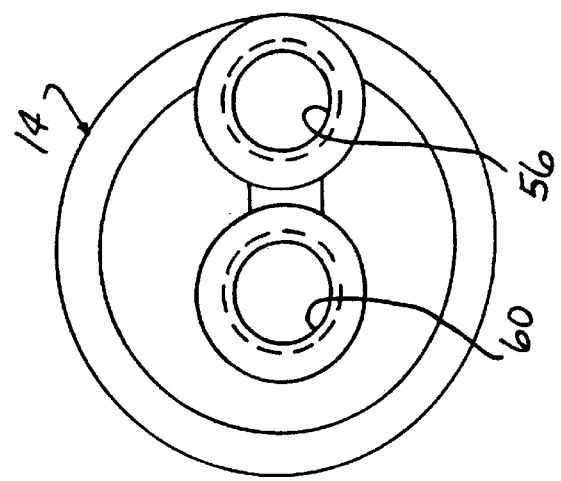
FIG. 4 is a bottom view of the oil filter mounting adapter according to the present invention.
Figure 6:
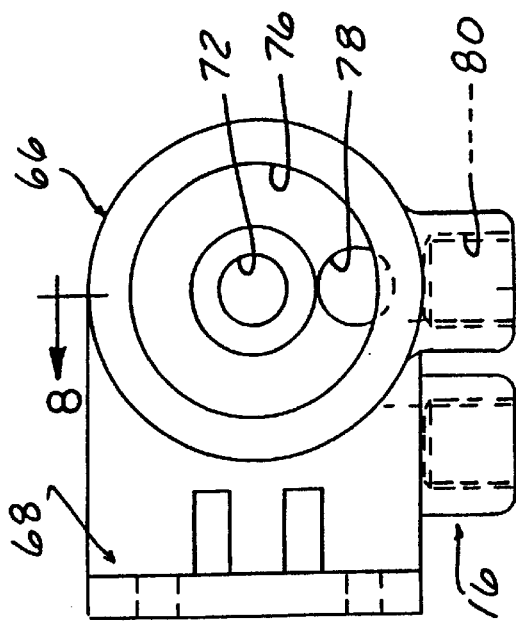
FIG. 6 is a top view of the remote oil filter and drain mounting bracket.
Figure 8:
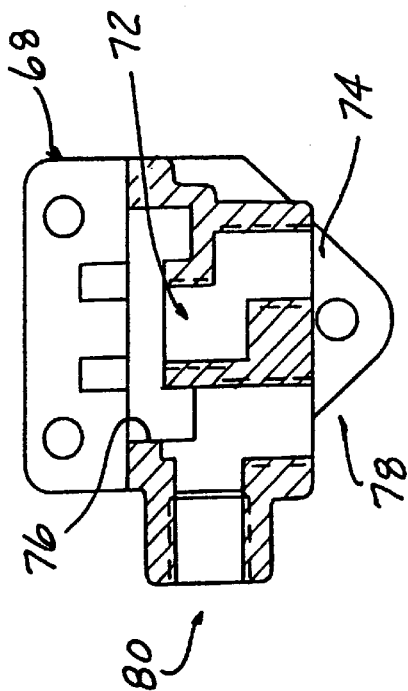
FIG. 8 is a cross-sectional view of the remote oil filter and drain mounting bracket taken as shown in FIG. 6.
Figure 7:
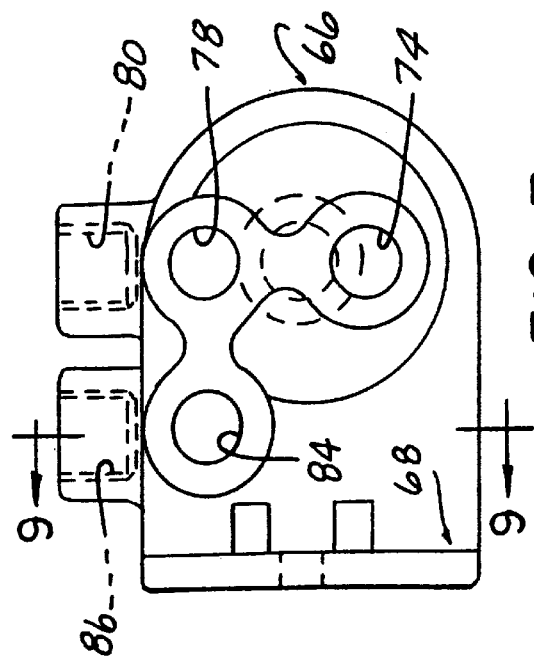
FIG. 7 is a bottom view of the remote oil filter and drain mounting bracket.
Figure 9:
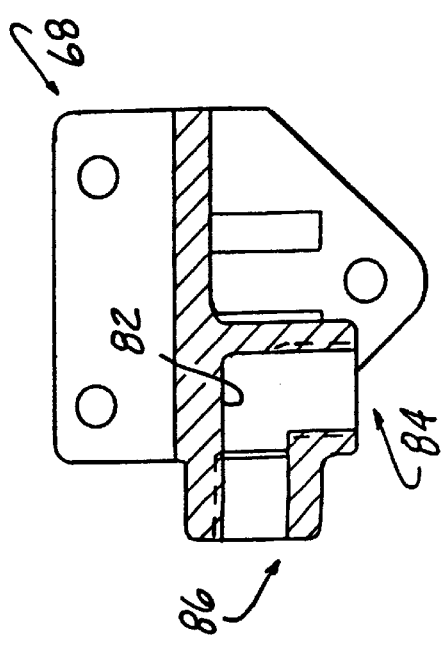
FIG. 9 is a cross-section view of the remote oil filter and drain mounting bracket taken as shown in FIG. 7.

An oil filter mounting adapter is shown in FIGS. 2–4. The oil filter mounting adapter 14 is commercially available and is generally referred to as a spin-on type adapter. The oil filter mounting adapter 14 has a generally circular first face 50. The first face 50 includes an O-ring groove 52 spaced inwardly from the outer periphery of the circular first face 50. Spaced inwardly from the O-ring groove 52 is a first fluid passage 54. The first fluid passage is in communication with a first external outlet 56 adapted to receive a hose connection fitting for attachment to a first hose 62. An internally threaded second fluid passage 58 is disposed generally in the center of the circular first face 50. The interior threads of the second fluid passage 58 permit the oil filter mounting adapter 14 to be threadingly engaged with the oil filter mounting boss normally located on the engine block of an internal combustion engine 12. The second fluid passage 58 is in fluid communication with a second external outlet 60. The second external outlet 60 is adapted to receive a hose connection fitting for engagement with a second hose 64. The oil filter mounting adapter 14 and associated hoses permit relocation of the oil filter to a more convenient location within the engine compartment. Fluid is generally delivered from the oil pump within the internal combustion engine through the first fluid passage 54 and associated hose to the oil filter element. After passing through the oil filter element, fluid is returned to the internal combustion engine through the second fluid passage 58 and its associated hose.

A remote oil filter and drain mounting bracket 16 is shown in detail in FIGS. 5–9. The remote mounting bracket 16 includes a filter mount portion 66 and a support bracket portion 68. The filter mount portion 66 includes a threaded nipple 70 for spinning on the filter element. The threaded nipple 70 is in fluid communication with a generally centrally disposed fluid passage 72 having a threaded external opening 74 adapted to receive a hose connection fitting for attachment to second hose 64. Disposed around threaded nipple 70 is an annular fluid passage groove 76 in fluid communication with a threaded external opening 78 adapted to receive a hose connection fitting for attachment to first hose 62. First hose 62 is also in fluid communication with a quick connect coupling for attachment to the external oil changing apparatus 10 of the present invention. The fluid connection to the first hose 62 can be made anywhere along the length of the fluid passage between the remote mounting bracket and the engine block, however, the preferred embodiment of the present invention provides a second external opening 80 in fluid communication with the annular fluid passage groove 76 of the remote mounting bracket 16. The second external opening 80 is adapted to receive a portion of the quick connect coupling which can be mounted on the remote mounting bracket providing a conveniently located support for connection to the external oil changing apparatus 10. It should be apparent that the second external opening 80 must be adequately sealed during operation of the internal combustion engine 12. It is envisioned that the quick coupling connection attached to the second external opening 80 would be of the self-sealing type, such that when the separable external oil changing apparatus 10 is not connected to the internal combustion engine 12, the portion of the quick coupling connection attached to the external opening 80 would be self-sealed, or in the alternative could be provided with an appropriate sealing end cap or plug.

Optionally, the filter mount portion 66 of the remote mounting bracket 16 can also include a third fluid passage 82 with first and second external openings 84 and 86 respectively. The first external opening 84 of the third fluid passage 82 is adapted to receive a hose connection fitting for connection to a third hose 88. The opposite end of the third hose 88 is connected to a drain plug adapter 18 which will be described in greater detail below. The second external opening 86 of the third fluid passage 82 is adapted to receive a portion of a second quick connect coupling for attachment to the external oil changing apparatus 10. As previously described, the quick connect couplings 46 and 48 are known in the art and commercially available. Preferably, each quick connect coupling 46 and 48 is separable into two portions, one of which is permanently mounted in the engine compartment and preferably self-sealing. The other portion of the quick connect couplings 46 and 48 is connected to the hose lines extending from the external oil changing apparatus 10 providing connections between the apparatus 10 and the internal combustion engine 12. This configuration of the remote mounting bracket 16 is the preferred embodiment, since it provides a central location for all connections to the external oil changing apparatus 10 and also supports the filter element in the same central location in a readily accessible position for easy replacement.

It should be recognized however that the present invention also includes within its scope separate remote mounting brackets one for mounting the oil filter and another one for supporting the quick connect couplings at a location spaced from the oil filter, if desired or necessary within the particular engine compartment being modified. In this particular instance, the external openings 80 and 86 could be adapted to receive hose connection fittings for attachment to the remote quick coupling connection mounting bracket. In addition, it should be recognized that the third hose 88 could be led directly to the remote quick coupling mounting bracket without passing through the remote mounting bracket of the oil filter. Furthermore, as previously mentioned, the fluid connection to the first hose 62 can be made anywhere along the fluid passage between the oil filter mounting adapter and the remote oil filter mounting bracket and can lead directly to the remote quick coupling connection bracket.

Figure 10:
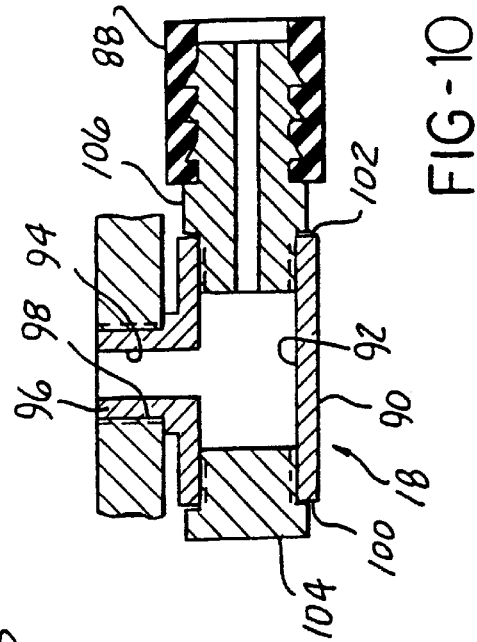
FIG. 10 is a cross-section view of a drain plug adapter according to the present invention.

A drain plug adapter 18 is shown in FIG. 10. The drain plug adapter 18 includes a body member 90 having a central through bore 92 extending therethrough and a branch through bore 94 which is in fluid communication with central through bore 92 and is angularly orientated thereto. Branch through bore 94 may have an externally threaded male first end 96 adapted to matingly engage within the internally threaded female aperture 98 formed in the bottom of the oil pan reservoir of the internal combustion engine 12.

In the alternative, an internally threaded end of branch bore 94 may be adapted to receive a portion of an externally threaded male connecting member therein. The connecting member may include a first externally threaded region adapted to be threadingly received in the internally threaded end of branch bore 94 and a second externally threaded region adapted to be threadingly received in the drain plug opening 98 of the oil pan reservoir of the internal combustion engine 12. To facilitate attachment of the drain plug adapter 18 in the drain plug opening 98, the connecting member may have a centrally positioned square or hexagonal shaped portion adapted to be engaged by known tools for turning the connecting member to threadingly engage within the aperture 98 of the oil pan reservoir and branch through bore 94 of the drain plug adapter 18. The connecting member, of course, would have a through bore longitudinally extending therethrough to bring the oil pan interior into fluid communication with the branch through bore 94 and the central through bore 92.

The central through bore 92 of the drain plug adapter 18 has first and second ends, 100 and 102 respectively. One end of the central through bore is adapted to receive a drain plug 104. The other end of the central through bore is adapted to receive a hose connection fitting 106. Preferably, the hose connection fitting 106 is a push-on type hose connection fitting adapted to sealingly engage an end section of hose without requiring the use of hose clamps, as is commercially available and known in the hose connecting art. The third hose 88 is attached to the drain plug adapter 18 at the outlet of central through bore 92.

While the invention has been described in detail, it will be apparent to those skilled in the art that the disclosed invention may be modified. Therefore, the foregoing description is to be considered exemplary, rather than limiting and the true scope of the invention is that defined in the following claims.

What is claimed is:

1. An apparatus for the automatic evacuation of a fluid from a first containment area into a second containment area, including replenishment of the first containment area with an amount of fresh fluid from a fresh fluid source, the apparatus comprising:

means for automatically evacuating and transferring the fluid from a first containment area into said second containment area, said evacuation and transferring means including an evacuation inlet end and an evacuation outlet end, said evacuation inlet end having first means for releasably connecting said evacuation inlet end with said first containment area so as to be in fluid communication therewith, and said evacuation outlet end having second means for releasably connecting said evacuation outlet end with said second containment area so as to be in fluid communication therewith;

means for supplying and regulating a flow of pressurized air into said first containment area whereby the flow of pressurized air acts to accumulate fluid for evacuation and transfer from said first containment area;

means for automatically filling said first containment area with an amount of fresh fluid after said first containment area has been evacuated, said filling means including a filling inlet and a filing outlet end, said filling inlet end in communication with said fresh fluid source, said filling outlet end having third means for releasably connecting said filling outlet end to said first containment area so as to be in fluid communication therewith; and means, in communication with said evacuation and transferring means and said filling means, for controlling the automatic evacuation and transfer of fluid from said first containment area into said second containment area and replenishment of fresh fluid into said first containment area from said fresh fluid source while said evacuation means and said filling means are in communication with said first containment area and said second containment area.

2. The apparatus according to claim 1, further comprising diagnostic devices in communication with said evacuation and transferring means for measuring the status, condition and volume of fluid during evacuation and transference of the fluid from said first containment area; wherein said second containment area is located at a position external to the apparatus of the present invention.

3. The apparatus according to claim 1, wherein said evacuation and transferring means comprise:

a conduit defining said evacuation inlet end and said evacuation outlet end;

pump means disposed in said conduit for generating vacuum pressure at said evacuation inlet end;

means for indicating pressure within said conduit; and wherein said pump means acts cooperatively with said means for supplying and regulating a flow of pressurized air into said first containment area so as to evacuate said first containment area of fluid.

4. The apparatus according to claim 1, wherein said first, second and third releasable connecting means are quick disconnection coupling members.

5. The apparatus according to claim 1, wherein said filling means comprises:

a conduit defining said filling inlet end and said filling outlet end;

valve means disposed in said conduit for selectively regulating the flow of fresh fluid in said conduit; and means for measuring the amount of fluid flow in said conduit.

6. The apparatus according to claim 5, further comprising:

a pump disposed in said conduit; and a regulator disposed in said conduit for selectively permitting fluid flow in said conduit.

7. An apparatus for the automatic evacuation and transfer of a fluid from a first containment area into a second containment area, including replenishment of the first containment area with a reconciliatory amount of new fluid from a fluid source, the apparatus comprising:

means for automatically evacuating and transferring the fluid from said first containment area into said second containment area, said evacuation and transferring means including an evacuation inlet end and an evacuation outlet end, said evacuation inlet end having first means for releasably connecting said evacuation inlet end with said first containment area so as to be in fluid communication therewith, and said evacuation outlet end having second means for releasably connecting said evacuation outlet end with said second containment area so as to be in fluid communication therewith;

means for supplying and regulating a flow of pressurized air into said first containment area, whereby the flow of pressurized air acts to accumulate fluid for evacuation and transfer from said first containment area;

means for automatically filling said first containment area with a reconciliatory amount of new fluid after said first containment area has been evacuated, said filling means including a filling inlet end and a filling outlet end, said filling inlet end in communication with said new fluid source, and said filling outlet end having third means for releasably connecting said filling outlet end to said first containment area so as to be in fluid communication therewith;

means, in communication with said evacuation and transferring means and said filling means, for controlling the evacuation and transfer of fluid from said first containment area into said second containment area and the reconciliatory replenishment of new fluid into said first containment area from said fluid source while said evacuation and transferring means and said filling means are in communication with said first containment area and said second containment area; and sampling means in communication with said evacuation and transferring means for obtaining a sample of the fluid during evacuation of the fluid from said first containment area.

8. An apparatus according to claim 7, wherein said evacuation and transferring means comprises:

a conduit defining said evacuation inlet end and said evacuation outlet end;

pump means disposed in said conduit for generating a vacuum pressure at said evacuation inlet end;

means for indicating pressure within said conduit; and whereby the pressurized air and said pump means acts cooperatively with said means for supplying and regulating the flow of pressurized air into said first containment area so as to evacuate said first containment area of fluid.

9. An apparatus according to claim 7, wherein said filling means comprises:

a conduit defining said filling inlet end and said filling outlet end;

valve means disposed in said conduit for selectively regulating the flow of new fluid in said conduit; and a flow meter disposed in said conduit for measuring the amount of fluid flow in said conduit, said flow meter in communication with said control means.

10. An apparatus according to claim 9, further comprising:

a pump disposed in said conduit; and at least one regulator disposed in said conduit for selectively permitting fluid flow in said conduit.

11. An apparatus for the automatic evacuation and transfer of a fluid from a first containment area into a second containment area, including replenishment of the first containment area with a reconciliatory amount of new fluid from a fluid source, the apparatus comprising:

means for automatically evacuating and transferring the fluid from said first containment area into said second containment area, said evacuation means including an evacuation inlet end and an evacuation outlet end, said evacuation inlet end having first means for releasably connecting said evacuation inlet end with said first containment area so as to be in fluid communication therewith, and said evacuation outlet end having second means for releasably connecting said evacuation outlet end with said second containment area so as to be in fluid communication therewith;

means for supplying and regulating a flow of pressurized air into said first containment area whereby the flow of pressurized air acts to accumulate fluid for evacuation and transfer from said first containment area;

means for automatically filling the first containment area with a reconciliatory amount of new fluid after said first containment area has been evacuated, said filling means including a filling inlet end and a filling outlet end, said filling inlet end in communication with the new fluid source, and said filling outlet end having third means for releasably connecting said filling outlet end to a said first containment area so as to be in fluid communication therewith;

means, in communication with said evacuation and transferring means and said filling means, for automatically controlling the automatic evacuation and transfer of fluid from a said first containment area into a said second containment area and the automatic reconciliatory replenishment of new fluid into a said first containment area from the fluid source while said evacuation and transferring means and said filling means are in communication with a said first containment area and a second containment area;

sampling means in communication with said evacuation and transferring means for automatically obtaining a sample of the fluid during evacuation and transference of the fluid from a said first containment area; and means in communication with said control means for prompting the user and eliciting a response from the user, whereby said responses control the automatic evacuation and transfer process.

12. An apparatus for the automatic evacuation of a fluid from a first containment area into a second containment area, including replenishment of the first containment area with a reconciliatory amount of new fluid from a fresh fluid source, the apparatus comprising:

means for automatically evacuating and transferring the fluid from a first containment area into said second containment area, said evacuation and transferring means including a conduit defining an evacuation inlet end and an evacuation outlet end, said evacuation inlet end having first means for releasably connecting said evacuation inlet end with said first containment area so as to be in fluid communication therewith, and said evacuation outlet end having second means for connecting said evacuation outlet end with said second containment area so as to be in fluid communication therewith, a pump disposed in said conduit for generating a suction pressure at said evacuation inlet end, means for sensing pressure, said pressure sensing means disposed in said conduit between said evacuation inlet end and said pump, means for supplying and regulating a flow of pressurized air into said first containment area, whereby the flow of pressurized air and said pump act to cooperatively evacuate and transfer fluid from said first containment area;

means for automatically filling said first containment area with an amount of fresh fluid after said first containment area has been evacuated, said filling means including a filling inlet end and a filling outlet end, said filling inlet end in communication with said fresh fluid source, said filling outlet end having means for releasably connecting said filling outlet end to said first containment area so as to be in fluid communication therewith; and means, in communication with said evacuation and transferring means and said filling means, for controlling evacuation and transfer of fluid from said first containment area into said second containment area and replenishment of fresh fluid into said first containment area from said fresh fluid source while said evacuation means and said filling means are in communication with said first containment area and said second containment area.

13. The apparatus of claim 12 wherein the flow of pressurized air and said pump simultaneously act to cooperatively evacuate and transfer fluid from said first containment area.

14. The apparatus of claim 12 further comprising means for analyzing fluid during evacuation and transference of the fluid from said first containment area, said analysis means in communication with said evacuation and transferring means.

15. The apparatus of claim 14 wherein said analysis means is a sampling device.

16. The apparatus of claim 12 wherein the evacuating and transferring means further comprises:
   means for measuring fluid flow;
   means for providing an output of said fluid flow measurements, said output means in communication with said control means;
   means for regulating fluid flow in said conduit, said flow regulating means being in communication with said fluid flow measuring means.

17. The apparatus of claim 12 wherein said connecting means includes at least one quick disconnect.

18. The apparatus according to claim 17, further comprising:
   a pump disposed in said conduit; and
   a regulator disposed in said conduit for selectively permitting new fluid flow in said conduit.

19. The apparatus according to claim 12, wherein said filling means comprises:
   a conduit defining said filling inlet end and said filling outlet end;
   valve means disposed in said conduit for selectively regulating the flow of new fluid in said conduit; and
   means for measuring the amount of new fluid in said conduit, said measuring means in communication with said control means providing data on said new fluid flow to said control means, whereby said control means adjusts said valve means accordingly.

20. The apparatus of claim 12 wherein said control means comprises:
   a computing device; and
   means in communication with said computing device for conveying data to a user and for controlling said evacuation and transferring means and said filling means.

21. An apparatus for the automatic evacuation and transfer of a fluid from a first containment area into a second containment area, including replenishment of the first containment area with a reconciliatory amount of new fluid from a fluid source, the apparatus comprising:
   means for automatically evacuating and transferring the fluid from said first containment area into said second containment area, said evacuation and transferring means including a conduit defining an evacuation inlet end and an evacuation outlet end, said evacuation inlet end having first means for releasably connecting said evacuation inlet end with said first containment area so as to be in fluid communication therewith, and said evacuation outlet end having second means for releasably connecting said evacuation outlet end with said second containment area so as to be in fluid communication therewith, a pump disposed in said conduit for generating a suction pressure at said evacuation inlet end, means for sensing condition of fluid passing with said conduit, said sensing means disposed within said conduit between said evacuation inlet end and said pump providing a output indicative of the conditions within said conduit, means for supplying and regulating a flow of pressurized air into said first containment area, whereby the flow of pressurized air and said pump simultaneously act to cooperatively evacuate said first containment area of fluid;

means for automatically filling said first containment area with a reconciliatory amount of new fluid after said first containment area has been evacuated, said filling means including a filling inlet end and a filling outlet end, said filling inlet end in communication with said new fluid source, and said filling outlet end having means for releasably connecting said filling outlet end to said first containment area so as to be in fluid communication therewith;

control means in communication with said evacuation and transferring means and said filling means for automatically controlling the evacuation and transfer of fluid from said first containment area into said second containment area and the automatic reconciliatory replenishment of new fluid into said first containment area from said fluid source while said evacuation and transferring means and said filling means are in communication with said first containment area and said second containment area; and means in communication with said evacuation and transferring means for analyzing a sample of the fluid during evacuation of the fluid from said first containment area.

22. The apparatus of claim 21 wherein the evacuation and transference means further comprises:
   a flow meter having an output in communication with said control means for indicating the amount of fluid flowing in said conduit; and
   means for regulating fluid flow within said conduit, said fluid flow regulating means comprising at least one actuating valve.

23. An apparatus according to claim 21 wherein said filling means comprises:
   a conduit defining said filling inlet end and said filling outlet end;
   valve means disposed in said conduit for selectively regulating the flow of new fluid in said conduit, said valve means in communication with said control means; and
   a flow meter disposed in said conduit for measuring the amount of new fluid flow in said conduit, said flow meter in communication with said control means providing new fluid flow data to said control means whereby said control means adjusts said valve means accordingly.

24. The apparatus of claim 23, further comprising:
   a pump disposed in said conduit; and
   regulator means disposed in said conduit for selectively permitting new fluid flow in said conduit.

25. The apparatus of claim 20, wherein said control means comprises:
   a computing device which operates on data; and
   means in communication with said computing device for user interface and control of said evacuation and transferring means and said filling means.

26. An apparatus for the automatic evacuation and transfer of a fluid from a first containment area into a second containment area, including replenishment of the first containment area with a reconciliatory amount of new fluid from a fluid source, the apparatus comprising:
   means for automatically evacuating and transferring the fluid from said first containment area into said second containment area, said evacuating and transferring means including a conduit defining an evacuation inlet end and an evacuation outlet end, said evacuation inlet end having first means for releasably connecting said evacuation inlet end with said first containment area so as to be in fluid communication therewith, and said evacuation outlet end having second means for releasably connecting said evacuation outlet end with said second containment area so as to be in fluid communication therewith, a pump disposed in said conduit for generating a suction pressure at said evacuation inlet end and said pump providing a signal indicative of the pressure within said conduit, means for supplying and regulating a flow of pressurized air into said first containment area, whereby the flow of said pressurized air and said pump simultaneously act to cooperatively evacuate said first containment area of fluid;

means for automatically filling the first containment area with a reconciliatory amount of new fluid after said first containment area has been evacuated, said filling means including a filling inlet end and a filling outlet end, said filling inlet end in communication with the new fluid source, and said filling outlet end having third means for releasably connecting said filling outlet end to a said first containment area so as to be in fluid communication therewith;

means, in communication with said evacuation and transferring means and said filling means, for automatically controlling the automatic evacuation and transfer of fluid from said first containment area into said second containment area and the automatic reconciliatory replenishment of new fluid into a said first containment area from the fluid source while said evacuation and transferring means and said filling means are in communication with a said first containment area and a second containment area;

sampling means in communication with said evacuation and transferring means for automatically obtaining a sample of the fluid during evacuation and transference of the fluid from a said first containment area; and means in communication with said control means for prompting the user and eliciting a response from the user, whereby said responses control the automatic evacuation and transfer process.

27. An apparatus for the evacuation of a fluid from a first containment area into a second containment area, including replenishment of the first containment area with an amount of fresh fluid from a fresh fluid source, the apparatus comprising:

means for evacuating and transferring the fluid from a first containment area into said second containment area, said second containment area being external to the apparatus for automatic fluid evacuation, said evacuation and transferring means including an evacuation inlet end and an evacuation outlet end, said evacuation inlet end having first means for releasably connecting said evacuation inlet end with said first containment area so as to be in fluid communication therewith, and said evacuation outlet end having second means for releasably connecting said evacuation outlet end with said second containment area so as to be in fluid communication therewith;

means for supplying a flow of pressurized air into said first containment area whereby a flow of pressurized air acts to accumulate fluid for evacuation and transfer from said first containment area;

means for filling said first containment area with an amount of fresh fluid after said first containment area has been evacuated;

wherein said means for evacuating and transferring fluid and said means for supplying and regulating a flow of pressurized air act cooperatively to evacuate and transfer fluid from said first containment area.

28. The device of claim 27 wherein said means for supplying and regulating a flow of pressurized air and said means for evacuating and transferring fluid simultaneously act to cooperatively evacuate and transfer fluid from said first containment area.

29. The apparatus according to claim 27, further comprising diagnostic devices in communication with said evacuation and transferring means for measuring the status, condition and volume of fluid during evacuation and transference of the fluid from said first containment area.

30. The apparatus according to claim 27, wherein said evacuation and transferring means comprises:

a conduit defining said evacuation inlet end and said evacuation outlet end;

pump means disposed in said conduit for generating vacuum pressure at said evacuation inlet end;

means for indicating pressure within said conduit;

means for supplying and regulating pressurized air into said first containment area, said means for supplying and regulating pressurized air and said pump means cooperatively act to evacuate said first containment area of fluid.

31. The apparatus according to claim 27, wherein said filling means comprises:

a conduit defining a filling inlet end and a filling outlet end, said filling outlet end having means for releasably connecting said filling outlet end to such first containment area, and said filling inlet end in communication with a source for the fresh fluid;

valve means disposed in said conduit for selectively regulating the flow of fresh fluid in said conduit; and means for measuring the amount of fluid flow in said conduit.

32. The apparatus according to claim 31, wherein said releasable connecting means are quick disconnection means.

33. The apparatus according to claim 32, further comprising:

a pump disposed in said conduit; and a regulator disposed in said conduit for selectively permitting fluid flow in said conduit.

* * * * *